May 20, 1952  R. A. KROPP  2,597,109
BRAKE SYSTEM FOR VEHICLES
Filed Aug. 20, 1949  3 Sheets-Sheet 1

Inventor
Roy A. Kropp

May 20, 1952 R. A. KROPP 2,597,109
BRAKE SYSTEM FOR VEHICLES
Filed Aug. 20, 1949 3 Sheets-Sheet 2

Inventor
Roy A. Kropp
by The Firm of Carter Hill Attys

May 20, 1952  R. A. KROPP  2,597,109
BRAKE SYSTEM FOR VEHICLES
Filed Aug. 20, 1949  3 Sheets-Sheet 3
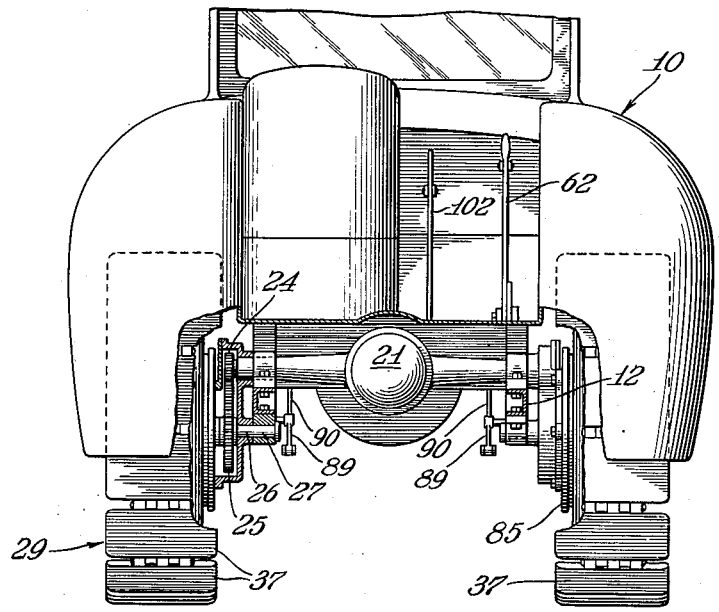
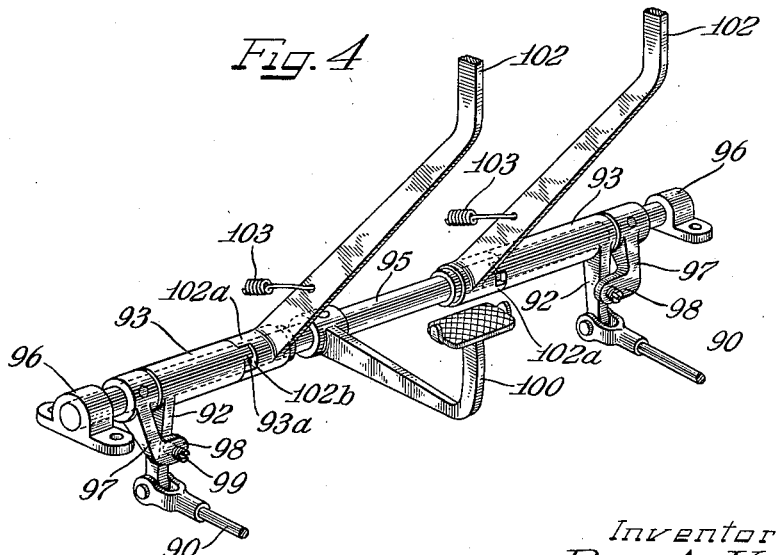
Inventor
Roy A. Kropp
by *[signature]* Attys Patented May 20, 1952

2,597,109

UNITED STATES PATENT OFFICE 2,597,109

BRAKE SYSTEM FOR VEHICLES

Roy A. Kropp, River Forest, Ill., assignor to Kropp Forge Company, Cicero, Ill., a corporation of Illinois Original application February 28, 1948, Serial No. 11,999. Divided and this application August 20, 1949, Serial No. 111,447

4 Claims. (Cl. 74—478)

This invention relates to improvements in a braking system for a vehicle such as a tractor. More particularly this invention has to do with a novel braking mechanism for a vehicle whereby the wheels on one side of the vehicle may be braked independently of the wheels on the other side thereof, or, alternately, the wheels on both sides of the vehicle may be braked simultaneously.

This novel braking system is particularly adapted for use with a motor vehicle which is convertible from a wheel type automotive vehicle to a tractor or crawler type. In such convertible vehicles, when the vehicle is operated as a tractor it is necessary for steering purposes to be able to brake each wheel separately and allow independent operation of the crawler track on each side of the vehicle. When the vehicle is used as a wheel type vehicle without a crawler track, it is necessary that the wheels on both sides of the vehicle be braked simultaneously for stopping purposes.

The present application is a division of my copending application Serial No. 11,999, filed February 28, 1948. In the parent application there is contained a complete disclosure of a novel convertible vehicle featuring among other items a novel endless track structure and a novel gear change transmission.

Braking systems for convertible vehicles have heretofore taken the form of extensive lever mechanisms and locking devices that have been difficult to operate and coordinate. Further, the mechanisms for steering and for braking a tractor type vehicle have often been independently actuated through separate controls. This plurality of controls has made the operation of such a vehicle very difficult and consequently inefficient.

According to the features of the present invention, two hand levers and one foot lever are mounted on a common shaft extending transversely of the vehicle near the operator's station. Each hand lever controls a linkage arranged to actuate a brake on the rear wheel on one side of the vehicle while the foot lever is arranged to actuate both linkages, thus effecting the simultaneously braking of the rear wheels on both sides of the vehicle. The hand levers can, of course, be actuated independently of each other and of the foot lever to brake one wheel.

It is therefore an important object of the present invention to provide a braking system for a convertible vehicle which is arranged to brake one rear wheel independently of the other rear wheel or to brake both rear wheels simultaneously.

Another object of this invention is to provide a braking system that may be used, without any modifications, when the vehicle is used as a crawler type or when used as a wheel type vehicle.

A further object of this invention is the provision of a braking system that is simple in construction and efficient in operation.

A still further object is the provision of a braking system which permits the operator to make use of his hands to steer the vehicle while controlling the forward movement of the vehicle by means of his foot.

Other and further features, objects and advantages of the present invention will become apparent to one skilled in the art from the following detail description taken in connection with the accompanying drawings.

On the drawings:

Figure 3 is a fragmentary rear elevational view, partly in section and partly broken away, of the vehicle of Figure 1; and Figure 4 is a fragmentary perspective view of the brake control mechanism of the present invention.

As shown on the drawings:

Figure 1:
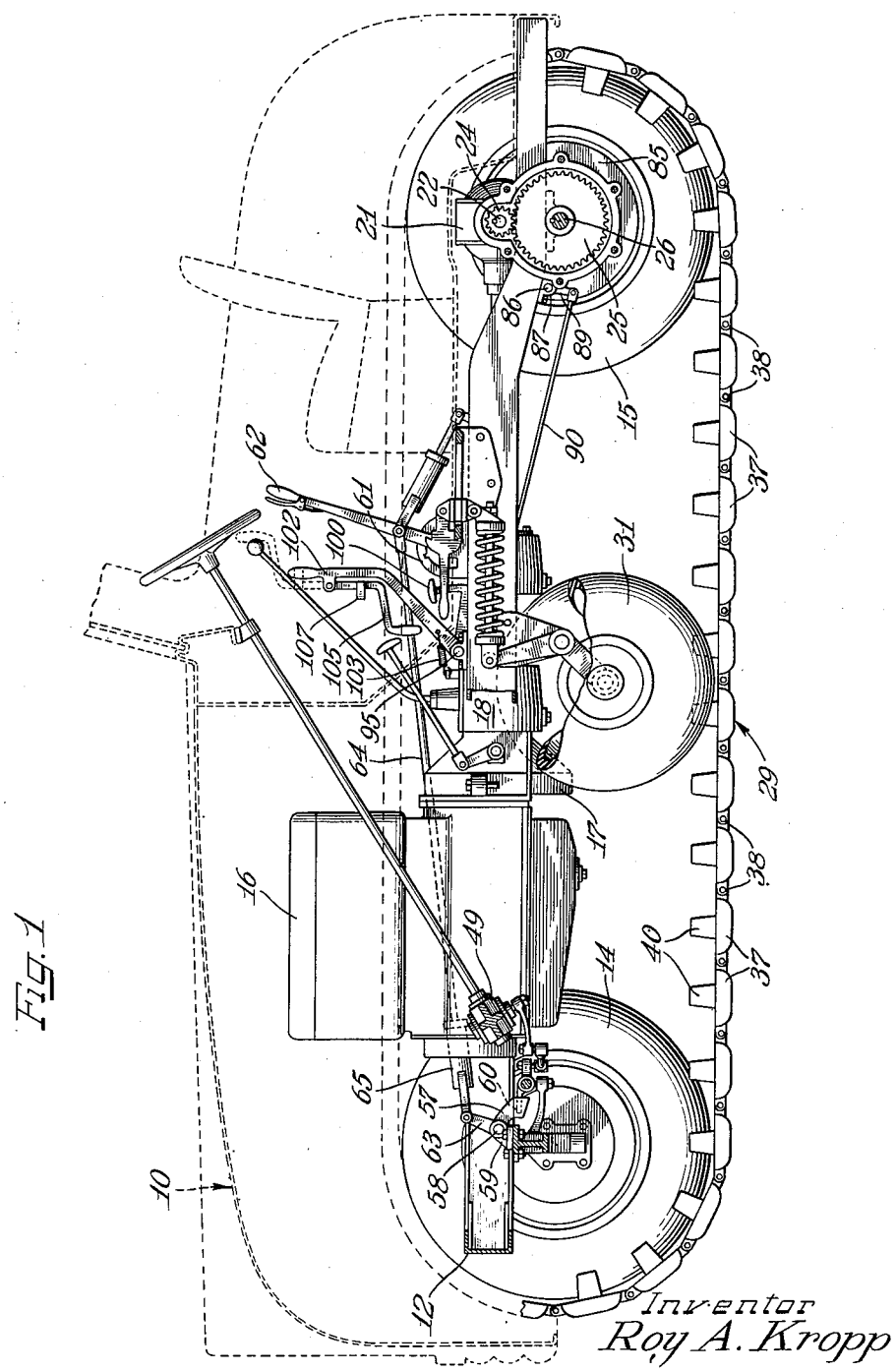
Figure 1 is a fragmentary side elevational view, partly in section and partly broken away, of the motor vehicle of the present invention showing the body portions in dotted lines.
Figure 2:
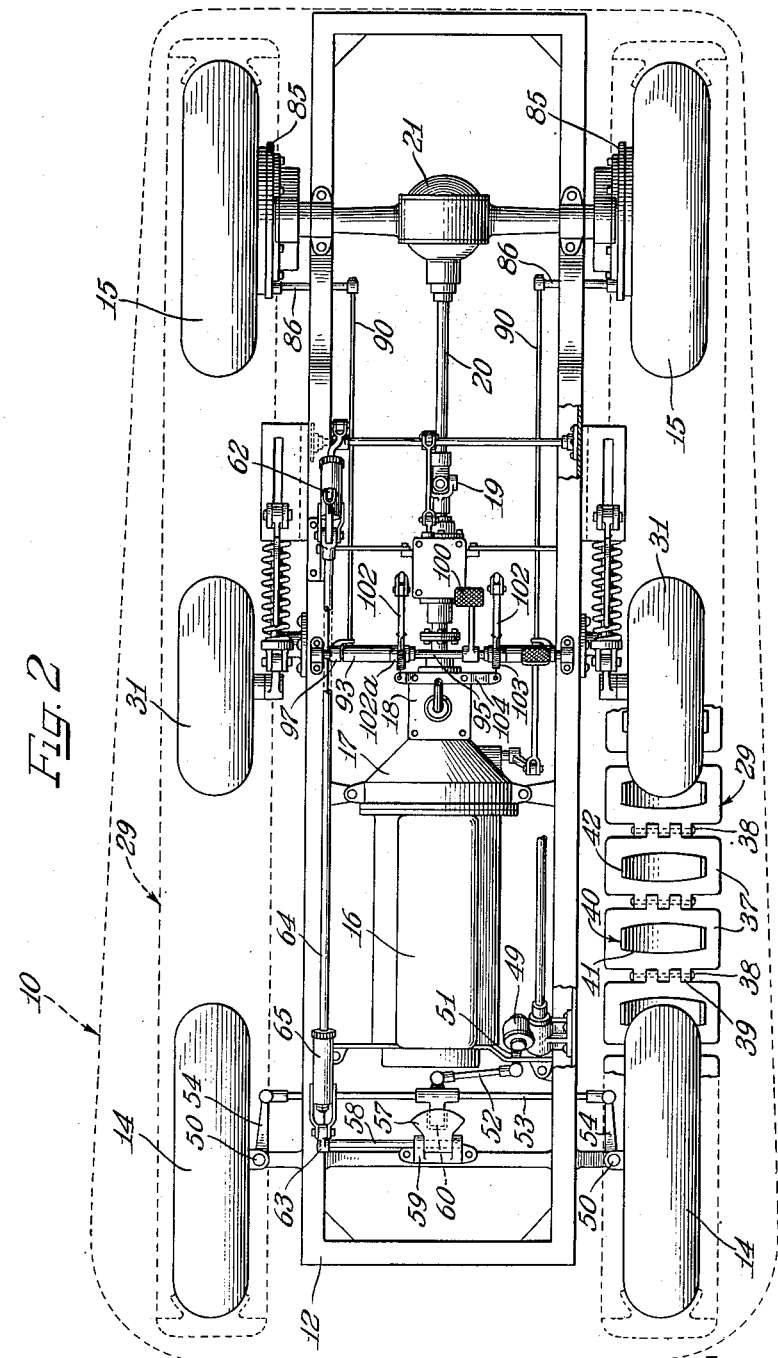
Figure 2 is a fragmentary plan view of the motor vehicle of Figure 1 with the body of the vehicle removed and shown only in dotted lines.

In Figures 1, 2 and 3 the reference numeral 10 indicates the body portion of a vehicle. This body is mounted on a frame structure 12 for support by front wheels 14 and rear wheels 15. A power plant 16, such as a gasoline engine, is arranged to drive the rear wheels 15 through a clutch 17, a transmission 18, a universal joint 19, a drive shaft 20, a differential 21, and a rear axle 22. A pinion gear 24 is keyed to the rear axle 22 and is in mesh with a driven gear 25 connected to the axle 26 of each rear wheel. The axle 26 may be advantageously journaled in a bearing block 27 secured to the underside of one member of the frame.

The motor vehicle 10 is adapted to be operated on the wheels 14 and 15 or as a tractor when crawler tracks 29 are mounted on the wheels. When the vehicle is operated as a tractor, a pair of auxiliary wheels 31, pivotally mounted from the frame 12, are movable downwardly to contact the crawler track and maintain its tensional position on the bed of the road.

Referring to Figures 1 and 2, it is seen that the crawler track 29 is made up of a series of substantially rectangular transverse plate members 37 hingedly connected together at their leading and trailing edges by pins 38 disposed in apertured lugs 39 projecting from the edges of the plate members 37. The ends of the pins 38 are swaged over to prevent them from sliding out of the lugs. However, at one hinged connection a removable bolt may be used as a pivot pin in order that the crawler track may be separated for dismounting. For the purpose of grippingly engaging the tires there is provided on each plate 37 an arcuate contact member 40 projecting up from the top surface of the plate and having a contact surface shaped to fit the contour of the tire.

The member 40 has generally arcuate leading and trailing edges 41 and has upstanding wall members 42 which are arranged to snugly engage the side walls of the tire (Figure 1).

When the vehicle 10 is operated as a wheel type automobile, steering movement of the front wheels 14 is accomplished through a standard worm and gear steering assembly 49 (Figure 3) which is connected to the front wheel king pins 50 by a pitman arm 51, a drag link 52, a tie rod 53, and a steering arm 54.

However, when the vehicle is operated as a tractor it is not possible to pivot the front wheels when the crawler tracks are in place, and steering must be effected by stopping or slowing down the crawler track on one side of the vehicle while allowing the track on the other side to propel the vehicle forwardly at its regular speed.

Thus, to convert a wheel type vehicle to a tractor, provision must be made for locking the conventional steering mechanism in position with the front wheels of the vehicle pointed directly ahead. Next, means must be provided for braking each rear wheel independently of the other wheel so that the movements of the crawler tracks can be separately controlled.

To lock the steering mechanism there is provided an inverted U-shaped locking member 57 (Figures 1 and 2) which is pinned to a shaft 58 journaled for pivoting in bearing block 59 on a forward cross member of the frame structure 12. When the shaft 58 is pivoted in one direction, the U-shaped locking member moves downwardly over a forwardly projecting arm 60 connected to the tie rod 53 and thus prevents sidewise steering movement of the tie rod. Since the arm 60 is disposed centrally on the tie rod, the front wheels will be locked in a position pointed directly ahead.

As best seen in Figure 1, the movement of the shaft 58 and consequently the locking member 57 is controlled from the cab of the vehicle by a lever 62 pivoted from an upstanding support member 61 and connected to the shaft 58 through a radius arm 63 and a tie rod 64. A spring-loaded cylinder 65 is connected between the tie rod 64 and the arm 63 and is arranged to resiliently transmit the pull of the tie rod 64 to the arm 63.

It will be readily seen that, when the tie rod is pulled to the right by the clockwise pivoting of the control rod 62, the spring will be compressed in the cylinder 65 until the resistance of the shaft 58 is overcome, at which time the shaft 58 and the locking member 57 will be pivoted into locking position. If the forwardly projecting arm 60 of the steering mechanism has not been properly centered, the locking member 57 will be resiliently pressed downwardly on the arm 60 so that, as soon as the steering mechanism is moved through the centering position, the locking member 57 will be snapped into position around the arm.

The provision of the spring-loaded cylinders 65 in the locking mechanism is a particular safety feature of this invention which causes the locking member 57 to be snapped into position and precludes the possibility of the vehicle being run off the crawler track by steering movement of the wheels.

When the motor vehicle 10 is operated as a wheel type of vehicle, braking is accomplished through typical mechanical brakes which may be either of the internally or externally expanding type. Separate linkages are connected to each rear wheel, and each linkage includes a brake drum 85 and a brake actuating rod 86 journaled in a bearing block 87 secured to the frame 12. A lever 89, which is secured to the rod 86, is pivotally connected to a brake rod 90. At its forward end the brake rod 90 is pivotally secured to an arm 92 (Figure 4) integrally formed at one end of a tubular sleeve 93. A rod 95, journaled at either end in bearings 96 secured to the frame 12, passes freely through each tubular sleeve 93. A lever 97, having a lower laterally extending foot portion 98, is secured to the rod 95 adjacent each sleeve 93 with the foot portion 98 overhanging the arm 92 of the sleeve 93. Adjusting screws 99 are provided on each foot portion 98 for equalizing the effective length of the brake rods 90.

Movement of the rod 95 is controlled by a foot pedal 100 secured thereto. When the pedal 100 is pushed down, the rod 95 will rotate in its bearings 96 and cause each lever 97 to contact its associated arm 92 and pivot it about the rod 95. Forward movement of the arms 92 pulls the brake rods 90 forwardly and causes braking of the rear wheels. Thus, when the vehicle is operated as an automobile, both rear wheels may be braked contemporaneously through the foot pedal 100.

As previously mentioned, when the vehicle is operated as a tractor it is necessary for steering purposes to be able to brake each wheel separately and allow independent operation of the crawler track on each side of the vehicle. This is accomplished by separate hand levers 102 which have lower tubular portions 102a rotatably mounted on the rod 95 adjacent each sleeve 93. A slot 102b in the tubular portion 102a is arranged to receive a laterally projecting arm 93a of the sleeve 93. The lever 102 and consequently the slot 102b will be returned to the position shown in Figure 4 by a spring 103 secured between the lever 102 and a bar 104 (Figure 2) secured across the housing of the transmission 18. Thus, when the arm 102 is rotated, the slot 102b will contact the arm 93a and cause the associated brake to be applied. However, when the sleeve 93 is rotated by the foot pedal 100, the lever 102 will not be moved due to the fact that the arm 93a can move in the slot 102b. Since the levers 102 act independently of each other, each rear wheel can be braked separately.

The details of the power transmission 18, the mounting and operation of the tensioning wheels, the construction of the body portion 10 of the vehicle, as well as further details of the operation of the braking system and its coordination with the other mechanisms, may be found in my above-mentioned parent application.

As explained in the parent application, the cab of the vehicle is so constructed that the operator can, if he desires, stand erect in the cab while operating the vehicle. For this purpose the brake levers 102 have been equipped with a pivotal extension member 105 which, as shown in Figure 1 in dotted lines, is arranged to be pivoted upwardly and has a strap member 107 which engages over the top portion of the lever 102 to hold the extension in upright position. Thus, when the operator is standing up and operating the tractor in this position, the brake control levers are still within easy reach of his hand.

From the foregoing description it is seen that there is provided in this invention a novel, efficient and simple braking mechanism which may be used, without modification, either when the vehicle is operated as a tractor or as a wheel type vehicle.

It will be understood that modifications and variations may be effected without departing from the scope of the novel concepts of the present invention.

I claim as my invention:

1. In a brake linkage system for steering or braking a vehicle by independently or simultaneously applying the brakes thereof, a frame, a shaft disposed transversely of said frame and journaled thereon for rocking movement with respect thereto, two sleeves rockingly mounted on said shaft and each having a lever arm extending therefrom, a separate actuating rod movable longitudinally of the frame and pivotally connected with each of said lever arms, two hand levers rockingly mounted on said shaft and having interengagement with said sleeves with a predetermined freedom of movement in the connection therebetween, for pivotally moving the same to rectilinearly move the associated actuating rods, two lever arms extending from said shaft and mounted for rocking movement therewith and each extending into position to have engaging contact with one of said lever arms, a foot pedal secured to said shaft intermediate said hand lever to pivot said shaft and simultaneously move said first lever arms through said second lever arms in a direction to longitudinally move said actuating rods without moving said hand levers, and spring means connected to each hand operated lever to return it to inoperative position.

2. In a brake linkage system for steering or braking a vehicle by independently or simultaneously applying the brakes thereof, a plurality of longitudinally movable actuating rods, two coaxial pivoted lever arms, each of said lever arms having pivotal connection with one of said rods, a separate hand-operated lever movable into contact with each pivoted lever for actuating the same to longitudinally move said rods in one direction, a shaft coaxial with said lever arms and levers, and having said lever arms and lever rockingly mounted thereon, a foot lever on said shaft, an interengaging connection between said shaft and said lever arms, to simultaneously pivot said lever arms upon operation of said foot lever, and a lost motion connection between said arms and hand levers accommodating said foot lever for operation independently of operation of said hand levers, and without causing movement thereof.

3. In a brake linkage system for steering or braking a vehicle by independently or simultaneously applying the brakes thereof, a plurality of longitudinally movable actuating rods, a transverse rock shaft, two coaxial lever arms, rockingly mounted on said shaft, each of said lever arms having operative connection with one of said rods, a separate hand operated lever for pivotally moving each of said lever arms and having inter-engaging connection therewith, said inter-engaging connection including a axially extending arm and slot connection having play between the arm and the slot and permitting pivotal movement of said lever arms in an actuating direction independently of said hand levers, and a foot lever coaxial with said hand levers and having engaging connection with said first levers to simultaneously pivot said lever arms independently of operation of said hand levers and without causing movement thereof.

4. In a brake linkage system for steering or braking a vehicle by independently or simultaneously applying the brakes thereof, a plurality of longitudinally movable actuating rods, a rocking shaft extending transversely of said arms, two coaxial lever arms rockingly mounted on said rocking shaft, each of said lever arms having operative connection with one of said actuating rods, a separate coaxial hand operated lever for operating each of said lever arms, an arm formed integrally with each of said lever arms and extending therefrom in axial direction, and each of said hand operated levers having an elongated arcuate slot receiving an associated axially extending arm, said slots being longer than the width of the associated arms, two levers secured to said shaft adjacent each of said lever arms and each having a leg portion extending into position to have contact with an associated lever arm, a foot pedal secured to said transverse shaft, for rocking said shaft, each actuating rod being movable independently of the other by an associated hand lever and both actuating rods being moved simultaneously by rocking movement of said shaft actuated by said foot lever, and spring means holding each hand operated lever in engagement with one end of an associated slot to prevent movement of said hand operated levers upon the simultaneous actuation of said rods by said foot pedal.

ROY A. KROPP.

REFERENCES CITED

The following references are of record in the file of this patent:

UNITED STATES PATENTS

| Number | Name | Date |
|---|---|---|
| 1,224,826 | Wiser | May 1, 1917 |
| 1,334,345 | Bilgore | Mar. 23, 1920 |
| 1,358,730 | Hartsough | Nov. 16, 1920 |
| 2,094,364 | Mardis | Sept. 28, 1937 |
| 2,369,936 | Barth | Feb. 20, 1945 |
| 2,387,236 | Cousino | Oct. 23, 1945 |
| 2,443,331 | Stewart | June 15, 1948 |